(12) United States Patent
Park

(10) Patent No.: US 7,133,089 B2
(45) Date of Patent: Nov. 7, 2006

(54) STRUCTURE OF SWITCHING DEVICE FOR LIQUID CRYSTAL DISPLAY DEVICE AND FABRICATION METHOD THEREOF

(75) Inventor: Hyun-Tak Park, Gyungsangbuk-do (KR)

(73) Assignee: LG.Philips LCD Co., Ltd, Seoul (KR)

( * ) Notice: Subject to any disclaimer, the term of this patent is extended or adjusted under 35 U.S.C. 154(b) by 69 days.

(21) Appl. No.: 10/610,906

(22) Filed: Jul. 2, 2003

(65) Prior Publication Data
US 2004/0125250 A1    Jul. 1, 2004

(30) Foreign Application Priority Data
Dec. 31, 2002    (KR) .................. 10-2002-0088472

(51) Int. Cl.
*G02F 1/136*    (2006.01)
(52) U.S. Cl. ..................... 349/43; 349/42; 345/92; 257/59; 257/72
(58) Field of Classification Search ................ 349/141, 349/43, 42; 257/59, 72; 345/92
See application file for complete search history.

(56) References Cited

U.S. PATENT DOCUMENTS

| | | | | |
|---|---|---|---|---|
| 5,032,883 A | * | 7/1991 | Wakai et al. | ......... 257/59 |
| 6,215,541 B1 | * | 4/2001 | Song et al. | ......... 349/141 |
| 6,255,130 B1 | * | 7/2001 | Kim | ......... 438/30 |
| 6,664,569 B1 | * | 12/2003 | Moon | ......... 257/72 |

OTHER PUBLICATIONS

C. W. Kim et al.; A Novel Four-Mask-Count Process Architecture for TFT-LCDs; SID 00 Digest; Digest of Technical Papers; pp. 1006-1009.

* cited by examiner

*Primary Examiner*—Huyen Ngo
(74) *Attorney, Agent, or Firm*—McKenna, Long & Aldridge

(57) ABSTRACT

A thin film transistor of an LCD device and a fabrication method thereof fabricates the thin film transistor of the LCD device including a source electrode unit of 'U' shape and a drain electrode of straight line shape formed as entering into a concave portion of the source electrode and a channel layer formed between the source electrode and a longer side of the drain electrode in fabricating the thin film transistor using a slit mask, and thereby, the LCD having even device property can be fabricated and inferiority such as short-circuit of the channel can be solved.

9 Claims, 7 Drawing Sheets

THIN FILM TRANSISTOR AREA   STORAGE CAPACITOR AREA

STRUCTURE OF SWITCHING DEVICE FOR LIQUID CRYSTAL DISPLAY DEVICE AND FABRICATION METHOD THEREOF

This application claims the benefit of Korean Patent Application No. 2002-88472, filed on Dec. 31, 2002, which is hereby incorporated by reference for all purposes as if fully set forth herein.

BACKGROUND OF THE INVENTION

1. Field of the Invention

The present invention relates to a switching device of a liquid crystal display device, and particularly, to a liquid crystal display device including a thin film transistor having a single-direction channel.

2. Discussion of the Related Art

Generally, a liquid crystal display (LCD) is an image display device which is able to display desired information by supplying data signals to pixels arranged in a matrix form according to information, and controls arrangement of the liquid crystal by an electric field.

Typically, the LCD includes: a liquid crystal panel on which unit pixels are arranged in a matrix form and integrated circuits (IC) for driving a liquid crystal. The liquid crystal panel further includes a color filter substrate and a thin film transistor (TFT) array substrate, and the liquid crystal is filled in space between the color filter substrate and the TFT array substrate.

In addition, on the TFT array substrate of the liquid crystal panel, a plurality of data lines for transmitting data signals supplied from data driver ICs toward the unit pixels and a plurality of gate lines for transmitting scan signals supplied from gate driver ICs to the unit pixels are crossed with each other in a right angle, and the unit pixels are defined on the crossed portions of the data lines and the gate lines. The gate driver ICs supply the scan signals sequentially to the plurality of gate lines to activate the unit pixels one by one sequentially, and the data signals are supplied to the unit pixels of an activated line from the data driver ICs.

On the other hand, a common electrode and a pixel electrode are formed on the color filter substrate and the TFT array substrate respectively facing each other to apply an electric field to the liquid crystal. The pixel electrode is formed on the TFT array substrate by unit pixels, while the common electrode is formed on the entire surface of the color filter substrate. Therefore, light transmittance of the liquid crystal cells can be controlled independently by controlling the voltage applied to each of the pixel electrodes.

As described above, in order to control the voltage applied to each of the pixel electrodes, a TFT is formed on each of the liquid crystal cells as a switching device.

The components of the above LCD will be described in detail with reference to the accompanying figures.

FIG. 1 is a plane view showing a unit pixel of a general LCD. Referring to FIG. 1, gate lines 4 are arranged on a substrate in a row direction apart from each other, and data lines 2 are arranged in a column direction apart from each other. A unit pixel is defined on every crossed portions of the data line 2 and of the gate line 4, and comprises a TFT and a pixel electrode 14. A gate electrode 10 of the TFT is formed as extended from a predetermined position of the gate line 4, and a source electrode 8, of which some part is overlapped with the gate electrode 10, is extended from the data line 2. In addition, a drain electrode 12 is formed on a position corresponding to the source electrode 8, and the pixel electrode 14 is electrically contacted with the drain electrode through a drain contact hole 16 formed on the drain electrode 12. The thin film transistor (TFT) comprises a semiconductor layer (not shown) for forming a conductive channel between the source electrode 8 and the drain electrode 12 when the scan signals are supplied to the gate electrode 10 through the gate line 4.

As described above, as the TFT forms the conductive channel between the source electrode 8 and the drain electrode 12 in response to the scan signals supplied from the gate line 4, the data signals supplied to the source electrode 8 through the data line 2 are transmitted to the drain electrode 12.

The pixel electrode 14 connected to the drain electrode 12 through the drain contact hole 16 is made of a transparent material, such as Indium Tin Oxide (ITO). At that time, the pixel electrode 14 generates an electric field on the liquid crystal layer in association with a common transparent electrode (not shown) formed on the color filter substrate in accordance with the data signals supplied from the drain electrode 12.

When the electric field is applied to the liquid crystal layer as described above, the liquid crystal molecules rotate due to dielectric anisotropy to transmit the light emitted from a backlight toward the color filter substrate through the pixel electrode 14, and the amount of the transmitted light is controlled by the amount of the voltage of the data signals.

In addition, a storage electrode 20 connected to the pixel electrode 14 through a storage contact hole 22 is deposited on the gate line 4 to form a storage capacitor 18, and a gate insulating layer (not shown) which is deposited during the forming process of the TFT is formed between the storage electrode 20 and the gate line 4. The storage capacitor 18 is to maintain operation of liquid crystal by charging voltage during the turned-on period of the TFT when the scan signal is applied to the gate line 4 and by supplying the charged voltage to the pixel electrode 14 during the turned-off period of the TFT.

FIG. 2 is a cross sectional view of a unit pixel taken along a line I–I' in FIG. 1, and includes a color filter substrate 60 facing the TFT array substrate 50 and attached with it; a spacer 70 separating the TFT array substrate 50 from the color filter substrate 60 with a predetermined distance therebetween; and a liquid crystal layer 80 which is the liquid crystal filled in the separated space between the TFT array substrate 50 and the color filter substrate 60.

The TFT (T), the switching device, and the storage capacitor (C) are formed on the TFT array substrate. The TFT is an essential device for driving the liquid crystal and is fabricated in a process using five masks presently.

The process using five masks will be described with reference to FIG. 3 as follows. FIGS. 3A~3E are views illustrating the processes for fabricating the TFT using the 5 masks.

First, as shown in FIG. 3A, an electrode material 302 for forming a gate line is formed on a glass substrate 301. The electrode material for forming the gate line is generally a metal layer, and also functions as lines on a storing area for maintaining a voltage for a predetermined time and as a gate pad unit.

After forming the gate metal layer, a photoresist (not shown) is deposited on the metal layer, and a photolithography process is performed using a first mask (not shown) to form selectively a channel area, a storing area and a gate pad unit pattern 302 on the glass substrate 301.

Next, as shown in FIG. 3B, a gate insulating layer 303 of SiNx, an active layer 304 and a conductive layer 305 are formed sequentially on the substrate. Then, a photolithography process is performed using a second mask (not shown) to etch the active layer 304 and the conductive layer 305 selectively so that the active layer 304 is defined as the channel area. At that time, the active layer 304 is formed by depositing amorphous silicon (a-Si) and a high doped n-type layer. Plasma enhanced chemical vapor deposition (PECVD) method is generally used to deposit the insulating layer (SiNx) and the active layer.

Next, as shown in FIG. 3C, a photoresist (not shown) is coated on the conductive layer 305 and then, a photolithography process is performed using a third mask (not shown). As a result of the above process, a part of the conductive layer 305 on an active area on which a channel of the TFT is formed is removed and the source/drain electrodes 306 and 307 are defined. Also, a portion of the conductive layer 305 is selectively etched so as to form a data pad unit through which the data signal is applied to the TFT.

Next, as shown in FIG. 3D, a passivation layer 308 is formed on the resultant surface, and then, a photolithography process is performed using a fourth mask (not shown) to selectively etch the passivation layer 308 so as to expose a part of the drain electrode 307 to form a contact hole.

Next, as shown in FIG. 3E, an electrode material is formed on the resultant surface, and a photolithography process is performed using a fifth mask (not shown) to form a pixel electrode 309 connected to the drain electrode 307.

The number of masks is an important factor for fabricating the LCD, and affects directly to the cost or productivity. Therefore, a fabrication method of the LCD using 4 masks has been suggested. In the process of fabricating the TFT using the four masks, it is important to form a half tone photoresist having different thickness by exposing differently depending on the positions of the TFT using a slit mask.

The related art slit mask structure will be described with reference to FIG. 4A. The slit mask comprises a source pattern unit 401 formed as 'U' shape to increase a channel length shown in FIG. 4A, a drain pattern unit 402 entered into a concave portion of the source pattern unit and separated by a predetermined distance from three sides of the concave portion, and a slit pattern unit 403. The slit pattern unit 403 further includes a horizontal unit 403a formed between the source pattern unit and the drain pattern unit and horizontal with a long side of the drain pattern, a vertical unit 403b which is vertical to the long side of the drain pattern, and a slant unit 403c where the horizontal unit and the vertical unit meet.

In the four-mask TFT process using the slit mask, the interval of slit and the pattern shape are important factors for determining a shape of the channel and accuracy. In the process of fabricating the pattern of the slit mask, the slit pattern must be fabricated in a precise way with a tolerance less than 2 μm. However, as shown in FIG. 4A, since the related art mask is formed as 'U' shape with the slant unit where the slit pattern is bent, the pattern interval becomes uneven especially around the slant unit. Even if the intervals between slits in the mask are the same, variation between the horizontal unit and the slant unit is generated due to technical limits of the mask during fabrication.

Generally, the difference between the width of a channel formed by the horizontal unit of the slit pattern and the width of a channel formed by the vertical unit of the channel is within 500 Å, while the difference between the width of the channel formed by the horizontal or vertical units of the slit pattern and the width of the channel formed by the slant unit of the slit pattern is about 2000 Å. FIG. 4B is a scanning electron microscope (SEM) photo showing a shape of an inferior channel due to the accuracy inferiority of the slit mask.

SUMMARY OF THE INVENTION

Accordingly, the present invention is directed to a switching device of a liquid crystal display device that substantially obviates one or more of the problems due to limitations and disadvantages of the related art.

An advantage of the present invention is to provide a thin film transistor having an active layer of a single direction by applying a slit mask on which slits are arranged toward the single direction in order to fabricate a thin film transistor of a liquid crystal display having even channel widths.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a thin film transistor of a liquid crystal display (LCD) may, for example, include a source electrode of 'U' shape, a drain electrode formed on a concave portion of the source electrode and a channel layer formed between the source electrode and a long direction of the drain electrode.

In another aspect of the present invention, a method of fabricating a switching device in an LCD may, for example, include forming a gate electrode on a substrate, forming a gate insulating layer, an active layer and a conductive layer sequentially on the substrate, forming a source electrode of 'U' shape and a drain electrode formed on a concave portion of the source electrode, forming a channel layer between a long direction of the drain electrode and the source electrode, and forming a passivation layer and a pixel electrode.

In another aspect of the present invention, a method of fabricating a thin film transistor for a liquid crystal display may, for example, include forming a gate electrode on a substrate; forming a gate insulating layer, an amorphous silicon layer, a high doped n type layer and a conductive layer sequentially on the substrate; forming source/drain electrodes and a channel area using a slit mask; and forming a pixel electrode, wherein the slit mask has a plurality of patterns such that the slit mask has a blocking portion, a diffraction exposure portion and a complete exposure portion, and wherein the plurality of patterns are positioned in the slit mask such that an amount of diffraction is substantially uniform in the diffraction exposure portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Light exposed through a slit mask has a very short wavelength, and therefore, accuracy of a slit width is very important to generate a diffraction. According to the present invention, a switching device of an LCD has a channel layer formed in a single direction by using a slit mask. The slit mask is arranged in a single direction in order to solve a problem that uneven exposure creates on a photoresist due to an inferiority of the slit mask, such as uneven etching or a channel layer cut.

A structure of the slit mask according to the present invention will be described with reference to FIG. 5. A slit mask according to the present invention includes: a source electrode pattern unit 501 having a 'U' shape for forming a source electrode having a 'U' shape; a drain electrode pattern unit 502 having a straight shape entered into a concave portion of the source electrode pattern unit and maintaining a predetermined distance from the source electrode pattern unit; and a slit pattern unit 503 parallel with the major axis of the drain electrode pattern unit and disposed on both sides of the major axis between the source electrode pattern unit 501 and the drain electrode pattern unit 502. These slit patterns are parallel with each other and have a same size. In the slit mask, a length of the 'U' shape channel is about 30 μm, and a separation distance between the source electrode pattern unit 501 and the drain electrode pattern unit 502 is about 51 μm. A width of the slit is about 1 μm.

Figure 1:
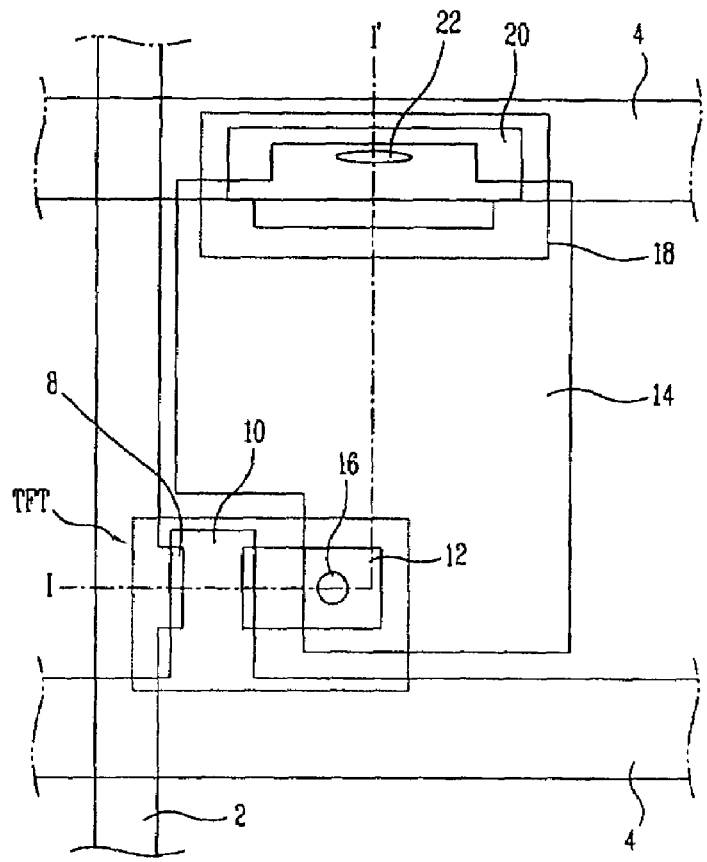
FIG. 1 is a plane view showing a unit pixel of a related art LCD.
Figure 2:
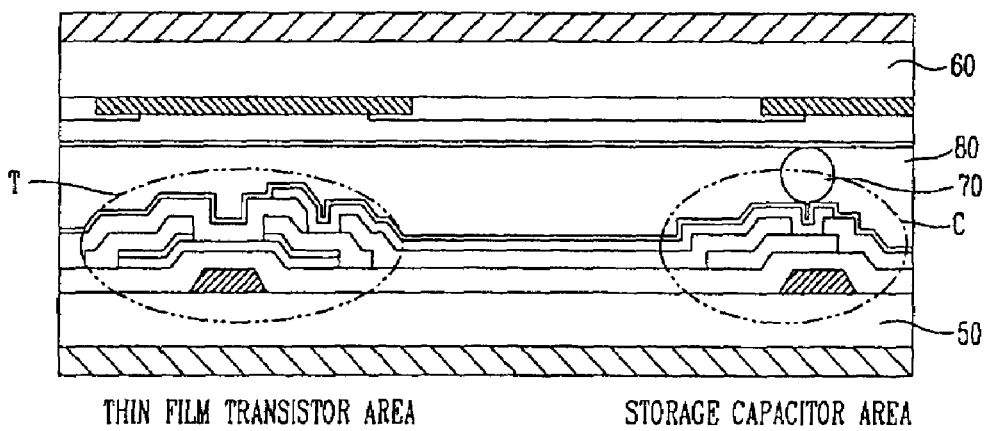
FIG. 2 is a cross-sectional view showing a liquid crystal panel in the related art LCD.
Figure 3A:
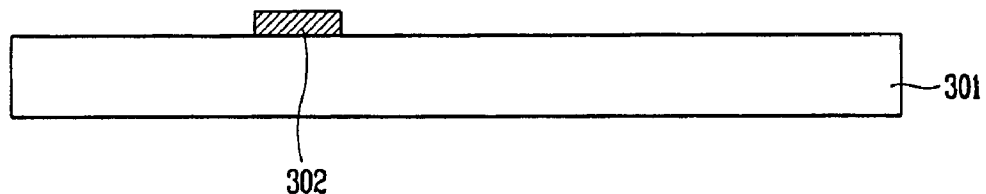
FIGS. 3A~3E are processing views illustrating the fabrication processes of the related art LCD.
Figure 3B:
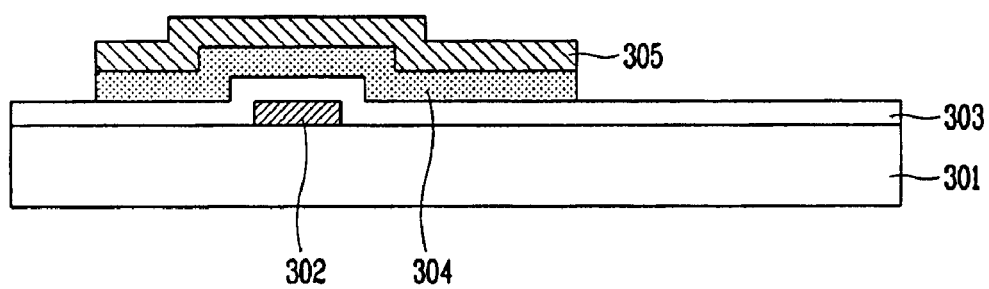
Figure 3C:
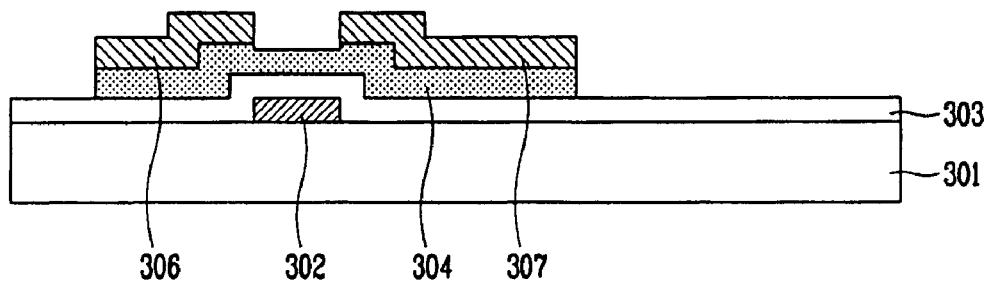
Figure 3D:
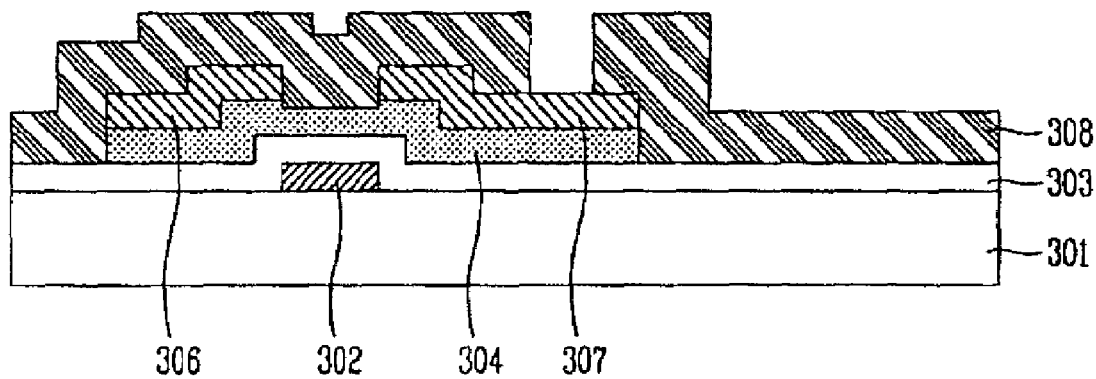
Figure 3E:
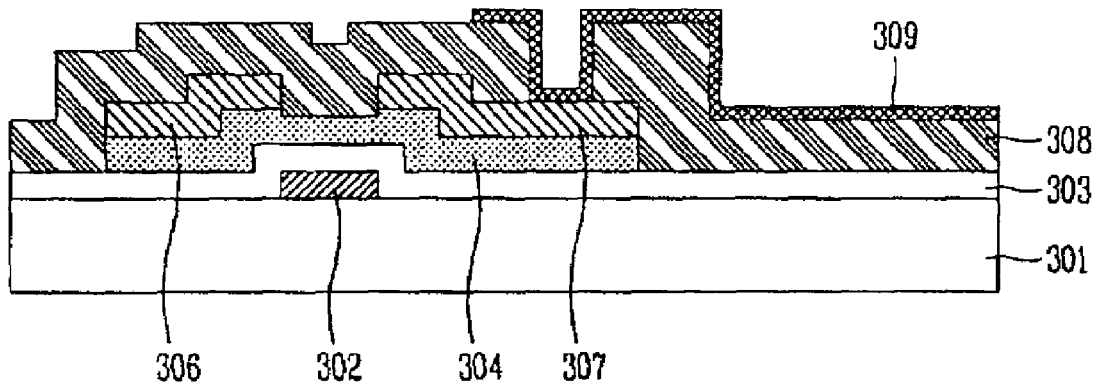
Figure 4A:
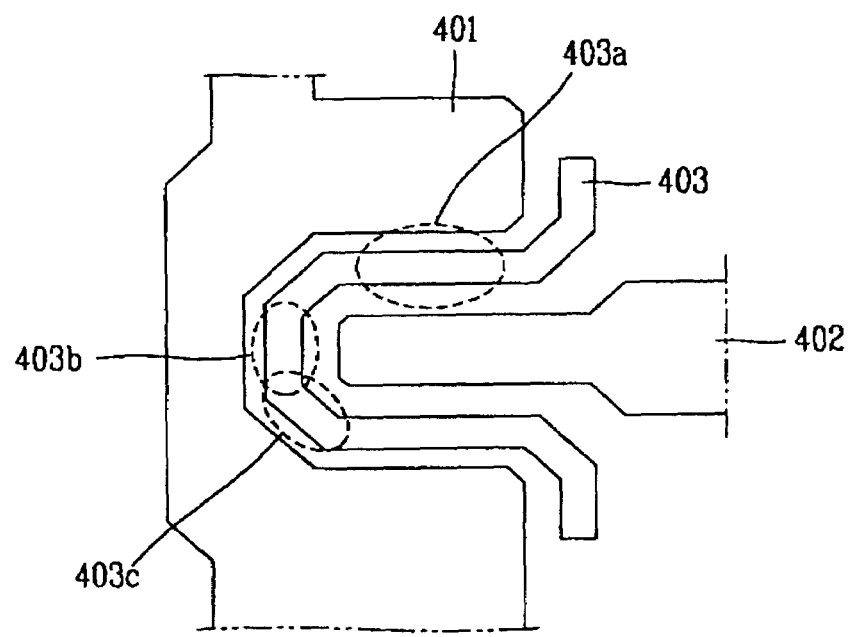
FIG. 4A is a view showing a pattern of a slit mask for forming a thin film transistor channel in the related art LCD.
Figure 4B:
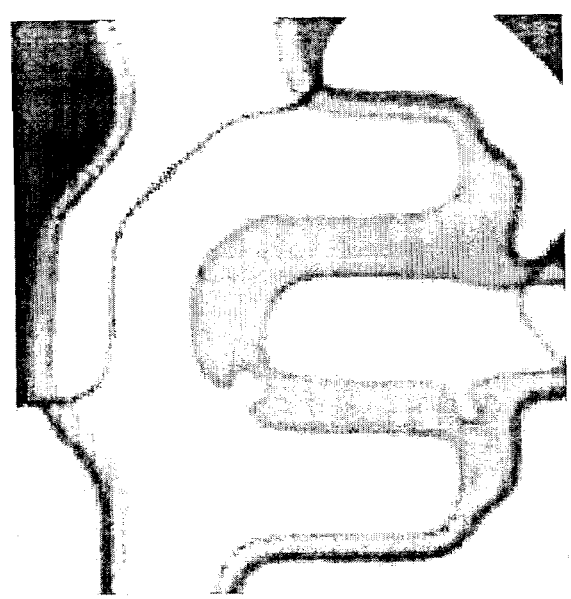
FIG. 4B is a photograph showing a channel inferiority of a thin film transistor fabricated by the slit mask of the related art LCD.
Figure 5A:
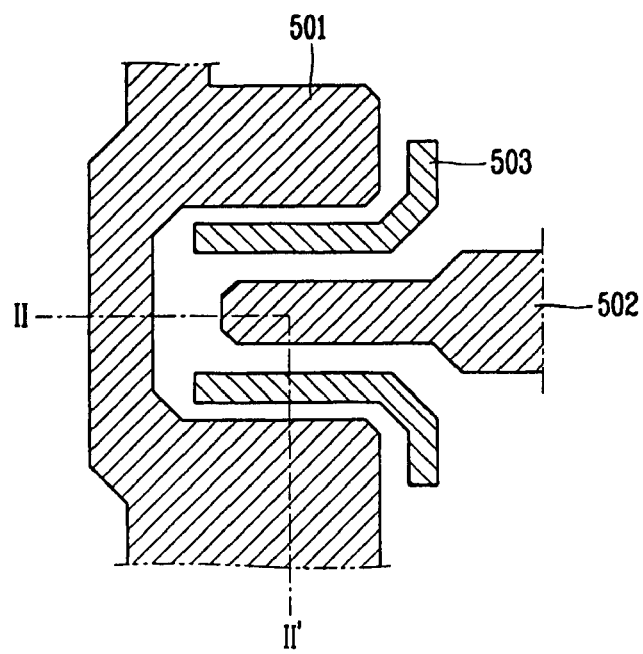
FIG. 5A is a view showing a pattern of a slit mask for forming a thin film transistor pattern in an LCD according to the present invention.

As shown in FIG. 5A, the slit pattern unit of the present invention is formed on both sides of the drain electrode pattern unit without a bent portion. Therefore, the channel layer is only formed on the left and right sides of the major axis direction of the drain electrode. Although the length of the channel is slightly shorter than that of the channel formed by the related art slit mask, this has little effect on the function of the thin film transistor.

Figure 5B:
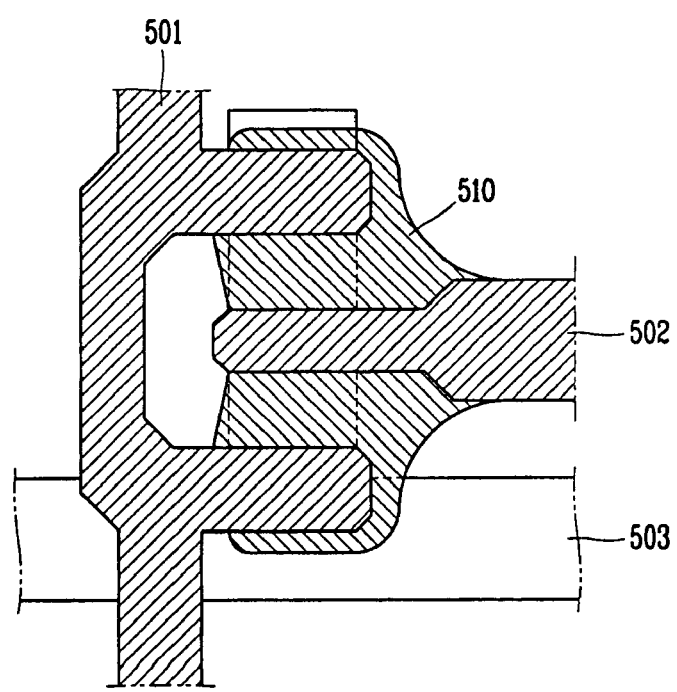
FIG. 5B is a rough view showing a channel formation of a switching device in the LCD according to the present invention.

FIG. 5B is a view showing a switching device form by using a slit mask according to the present invention. The switching device comprises a source electrode having a 'U' shape and a drain electrode having a '□' shape formed by the slit mask of the present invention, and the channel area 510 is formed between a long side of the drain electrode and the source electrode. The channel is not formed between the short side of the drain electrode and the source electrode, as illustrated in FIG. 5B.

Figure 6A:
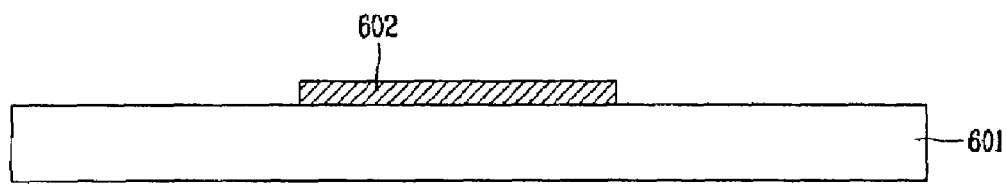
FIGS. 6A–6G are processing views illustrating fabrication processes of the thin film transistor using a slit mask according to the present invention.

A method for forming a switching device of an LCD according to the present invention by applying the above mask will be described as follows. FIGS. 6A–6G are cross-sectional views taken along a line II–II' in FIG. 5A, illustrating fabricating processes for a switching device. First, as shown in FIG. 6A, an electrode material is formed on the substrate 601, and then, a photolithography process is performed using a first mask (not shown) to pattern a gate line and a gate electrode 602 on the substrate 601.

Figure 6B:
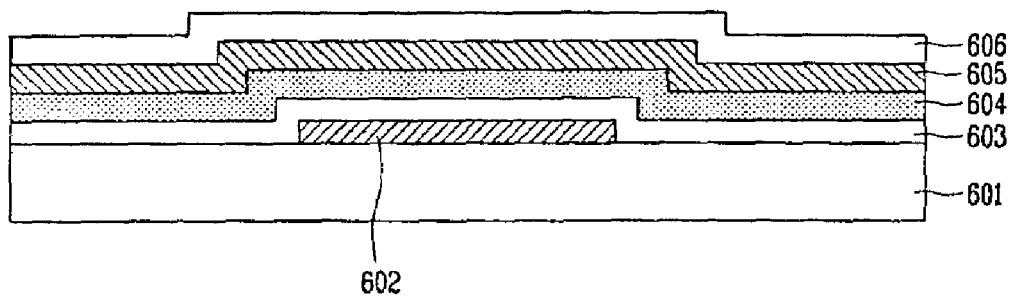

After forming the gate line, as shown in FIG. 6B, a gate insulating layer 603 of SiNx or SiO$_2$ material, an active layer and a conductive layer 606 made of a conductive material are sequentially formed. At that time, the active layer is an amorphous silicon (a-Si) layer 605 and a high doped n-type layer 605. Also, source and drain electrodes will be formed on the conductive layer 606.

Figure 6C:
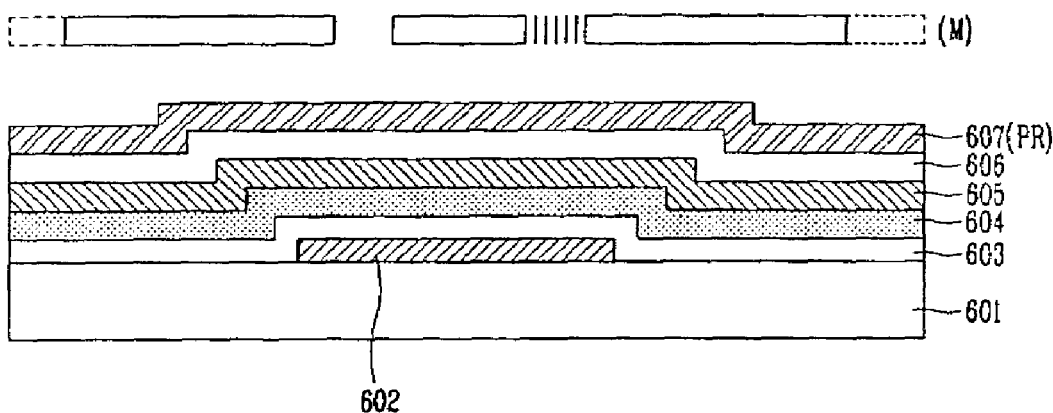

Next, as shown in FIG. 6C, a photo resist 607 is formed on the conductive layer 606, and after that, a photolithography process is performed using a second mask (M), which is the slit mask of the present invention, to form a pattern of the photoresist (PR) which is selectively remained on the channel area.

As a result of the above process, a diffraction exposure is made between the source electrode unit and the long side of the drain electrode to form a photoresist pattern having a stepped portion, and complete exposure is made between the source electrode unit and the short side of the drain electrode unit. Then, part of the photoresist is removed in the PR developing process to expose the conductive layer 606.

Figure 6D:
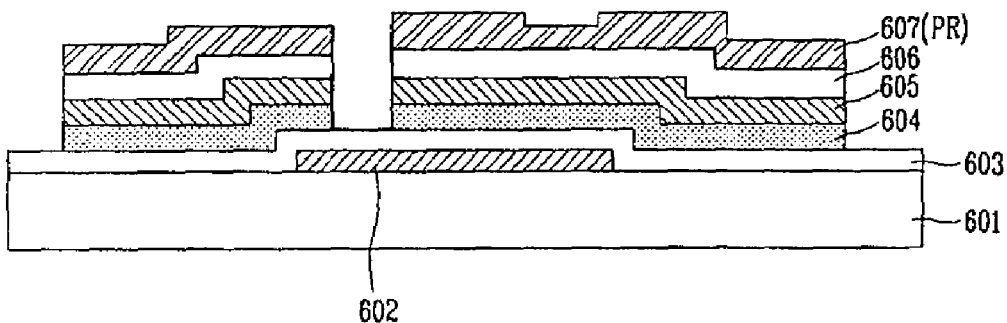

FIG. 6D is a view showing an etching process after completing the above development process with the mask. As the PR is removed through the development process, the area except the exposed active area, the conductive layer 606 disposed on an exposed area between the short side of the drain electrode unit and the source electrode, the high doped n-type layer 605 and the a-si layer 604 are etched and removed. Therefore, the photoresist pattern having the stepped portion formed by the diffraction exposure using the slit mask remains on the source/drain electrodes, as shown in FIG. 6D.

Figure 6E:
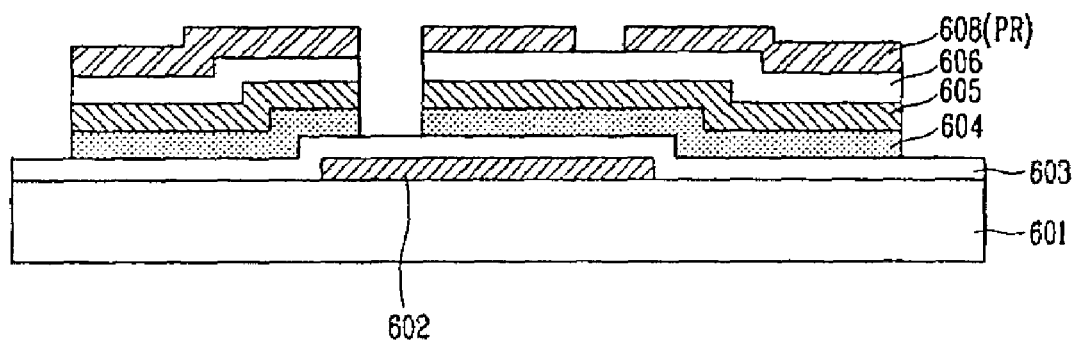

Next, an ashing process is performed on the stepped PR pattern to remove a part of the PR and to expose the high doped n-type layer between the source and drain electrodes. FIG. 6E shows that the high doped n-type layer between the source and drain electrodes is exposed.

Figure 6F:
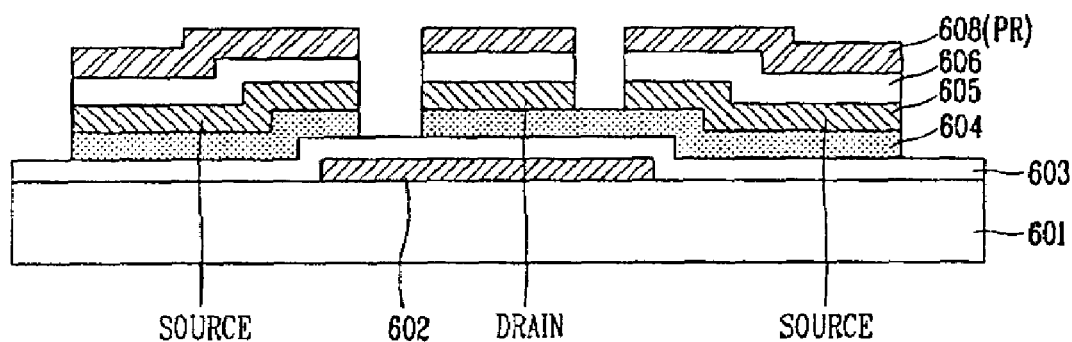
Figure 6G:
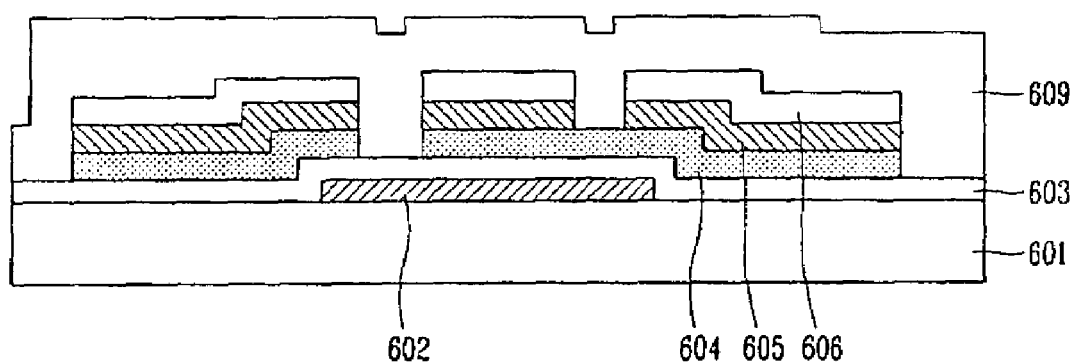

Next, as shown in FIG. 6F, the conductive layer 606, which is exposed because the PR pattern is selectively removed, and the active layer 604 and 605 are etched as much as a predetermined thickness to separate completely the source/drain areas, and then, the remaining PR 608 is removed. At that time, the active layer between the source electrode and the long side of the drain electrode remains, while the active layer between the source electrode and the short direction of the drain electrode is removed so as not to form the channel.

Next, as shown in FIG. 6Q a passivation layer 609 of SiNx material is formed on the entire surface. Next, a contact hole is formed using a photolithography process, and then, a pixel electrode is formed to complete the switching device.

According to the fabrication method of the LCD of the present invention, which fabricates thin film transistors using a slit mask, the structure of the slit mask is constructed to include a slit pattern unit of a single direction. This is to fabricate thin film transistors having a uniform channel, and therefore, the device property can be made even. Also, the short circuit problem on the channel due to the line width inferiority can be solved, and yield can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fabrication method of a switching device for a liquid crystal display (LCD) comprising:
   forming a gate electrode on a substrate;
   forming an insulating layer, an amorphous silicon layer, a high doped n-type layer and a conductive layer;
   forming source/drain electrodes;
   forming a channel layer by applying a single direction slit mask, wherein the single direction slit mask includes a source electrode pattern unit having a 'U' shape, a drain electrode pattern unit formed on a concave portion of the source electrode pattern unit and a slit pattern unit being substantially free of a bent portion inside the concave portion and aligned in a single direction between the source electrode pattern unit and the drain electrode pattern unit;
   forming a passivation layer; and
   forming a pixel electrode.

2. The method of claim 1, wherein the slit pattern unit is formed to be parallel with a long direction of the drain electrode pattern unit.

3. The method of claim 1, wherein the slit pattern unit is formed on both sides of the drain electrode pattern unit.

4. A fabrication method of a switching device in an LCD comprising:
   forming a gate electrode on a substrate;
   forming a gate insulating layer, an active layer and a conductive layer sequentially on the substrate, the active layer having an amorphous silicon layer and a doped layer;
   forming a source electrode of 'U' shape and a drain electrode formed on a concave portion of the source electrode;
   forming a channel area of the switching device only between a long direction of the drain electrode and the source electrode by removing the active layer between a short direction of the drain electrode and the source electrode; and
   forming a passivation layer and a pixel electrode.

5. The method of claim 4, wherein the channel area is formed by applying a slit mask which comprises a source electrode pattern unit having a 'U' shape and a drain electrode pattern unit having a straight line shape formed on a concave portion of the source electrode pattern unit of 'U' shape and a slit pattern unit aligned in a single direction between the source electrode pattern unit and the drain electrode pattern unit.

6. The method of claim 4, wherein the channel area is symmetric as centering around the drain electrode.

7. A fabrication method of a thin film transistor for a liquid crystal display comprising:
   forming a gate electrode on a substrate;
   forming a gate insulating layer, an amorphous silicon layer, a high doped n type layer and a conductive layer sequentially on the substrate;
   forming source/drain electrodes and a channel area using a slit mask; and
   forming a pixel electrode,
   wherein the slit mask has a plurality of patterns such that the slit mask has a blocking portion, a diffraction exposure portion and a complete exposure portion,
   wherein the plurality of patterns comprises a source electrode pattern having a 'U' shape,
   a drain electrode pattern formed on a concave portion of the source electrode pattern and
   a slit pattern being substantially free of a bent portion inside the concave portion and aligned in a single direction between the source electrode pattern and the drain electrode pattern, and
   wherein the plurality of patterns are positioned in the slit mask such that an amount of diffraction is substantially uniform in the diffraction exposure portion.

8. The method of claim 7, wherein the slit pattern is formed to be parallel with a long direction of the drain electrode pattern.

9. The method of claim 7, wherein the slit pattern is formed on both sides of the drain electrode pattern.

* * * * *